H. J. WAREHAM.
COUPLING FOR THE ENDS OF ELASTIC OR OTHER EXERCISER CORDS.
APPLICATION FILED OCT. 22, 1910.

989,216.

Patented Apr. 11, 1911.

WITNESSES:
John H. Hoving.
F. H. Logan.

INVENTOR:
HAROLD JOHN WAREHAM
by H. van Oldenneel
Attorney

UNITED STATES PATENT OFFICE.

HAROLD JOHN WAREHAM, OF BRIXTON, LONDON, ENGLAND.

COUPLING FOR THE ENDS OF ELASTIC OR OTHER EXERCISER-CORDS.

989,216.  Specification of Letters Patent. Patented Apr. 11, 1911.

Application filed October 22, 1910. Serial No. 588,676.

*To all whom it may concern:*

Be it known that I, HAROLD JOHN WAREHAM, a citizen of the United Kingdom of Great Britain and Ireland, and resident of 28 Gateley road, Brixton, London, England, have invented certain new and useful Improvements in Couplings for the Ends of Elastic or other Exerciser-Cords, of which the following is a specification, such as will enable others skilled in the art to which it appertains to make and use the same.

This invention relates to spring hooks for cords, particularly the cords of exercising apparatus, and to that form of hook which comprises a tubular portion or socket adapted to receive the cord and from which a curved arm extends, the said arm forming the hook proper while a tongue attached to the socket and reaching to the end of the curved arm forms the guard or hip.

The invention concerns this guard in particular, and as a secondary feature an improvement in the arm.

My guard comprises a spring placed within the said socket, one end of which spring is bent to enter an aperture in the socket while the other end reaches the end of the arm, said arm being preferably strengthened by a rib and having a recess to receive the end of the spring.

Figure 1:
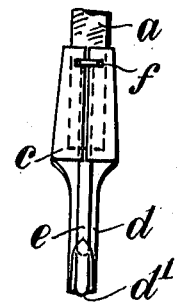
Figure 2:
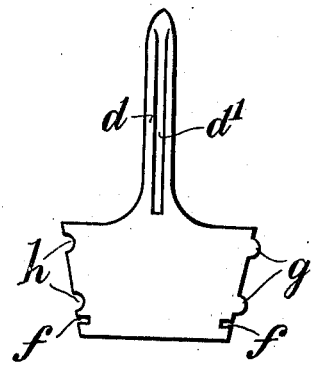
Figure 3:
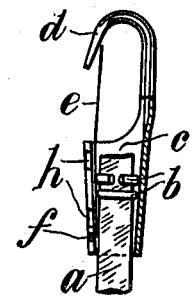

In the drawings, Figure 1. shows a form of my invention. Fig. 2. shows a blank or stamping from which my hooks can be made. Fig. 3. shows a sectional view of a hook made from a blank such as that shown in Fig. 2.

$a$ is the elastic or other cord placed in the socket $c$ of the hook and held therein by metallic rings $b$. The extended arm $d$, which in the drawings is shown integral with the socket, is bent over in hook fashion and has a strengthening rib $d'$ pressed up in it.

$e$ is the spring forming the guard, the end of which enters the slot-like aperture $f$ in the socket $c$ being held therein by the pressure of the cord or rings.

The examples shown in Figs. 2 and 3 have lugs $g$ and recesses $h$ which engage each other when the metal is bent round to form the socket. These lugs and recesses are useful to prevent lengthwise displacement of the contacting edges of the socket if the same is made of light metal and is subjected to much strain.

The position and shape of the apertures $f$ are unimportant providing the slot is sufficiently low in the socket to bring the spring into contact with the cord or rings. A recess on the inner side of the arm $d$ and at its extremity serves to keep the guard from lateral displacement.

It will be observed that my improved hook comprises two parts only.

What I claim and desire to secure by Letters Patent is:—

In a spring hook for cords, the combination with a tapering shell or socket provided with a hook and with an opening, the latter being removed inwardly from the larger end of the socket, of a spring guard for the hook, said guard having a portion disposed within the socket and provided with a projection received within the aforesaid opening, a cord received within the socket, and a hard member encircling the cord which is adapted to bear against the spring guard within the socket and hold the projection thereon in the opening aforesaid.

In witness whereof I have hereunto set my hand in presence of two witnesses.

HAROLD JOHN WAREHAM.

Witnesses:
HENRY FAIRBROTHER,
JNO. FRANKLYN ALDRIDGE.